Patented May 30, 1950

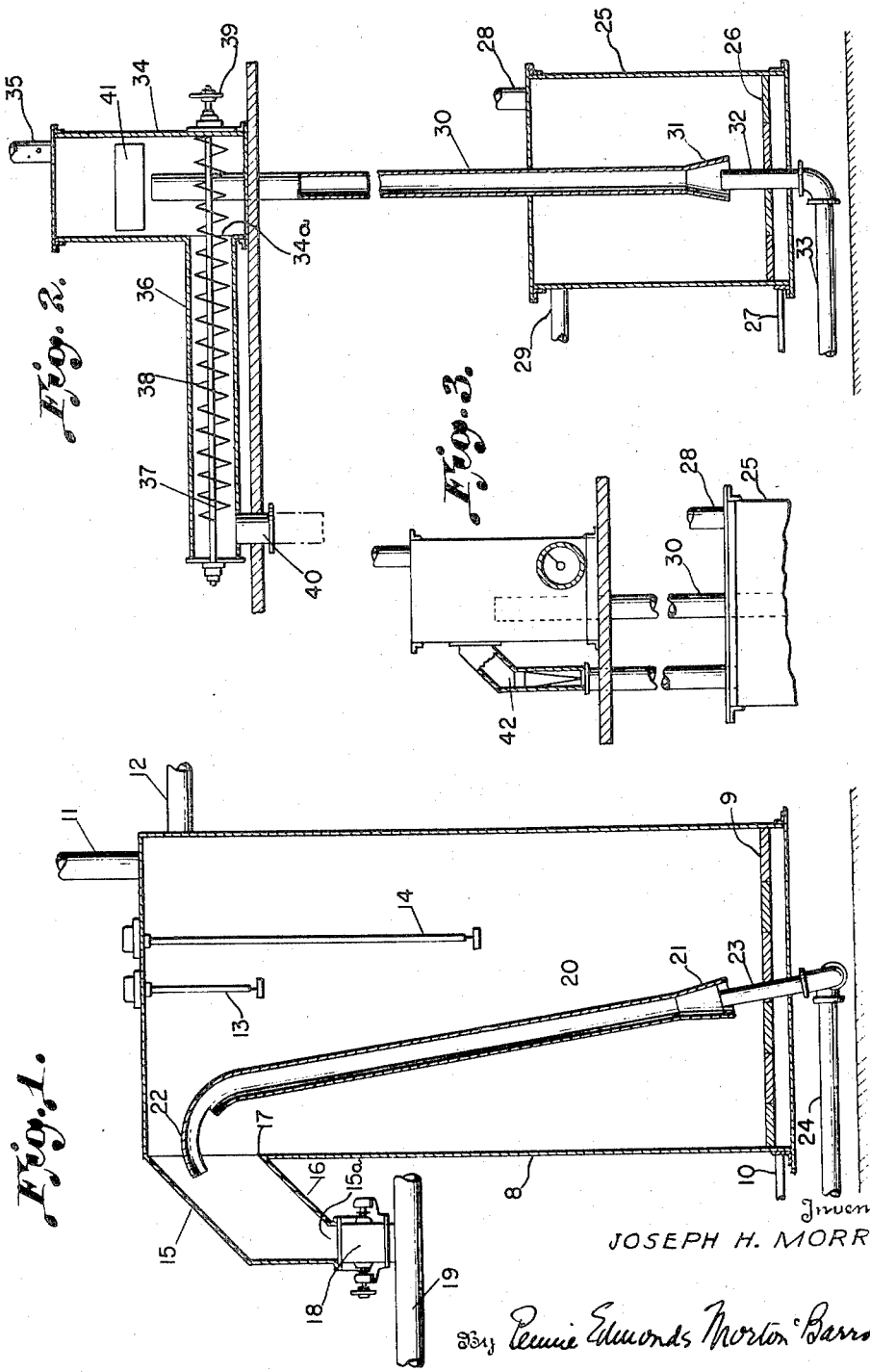

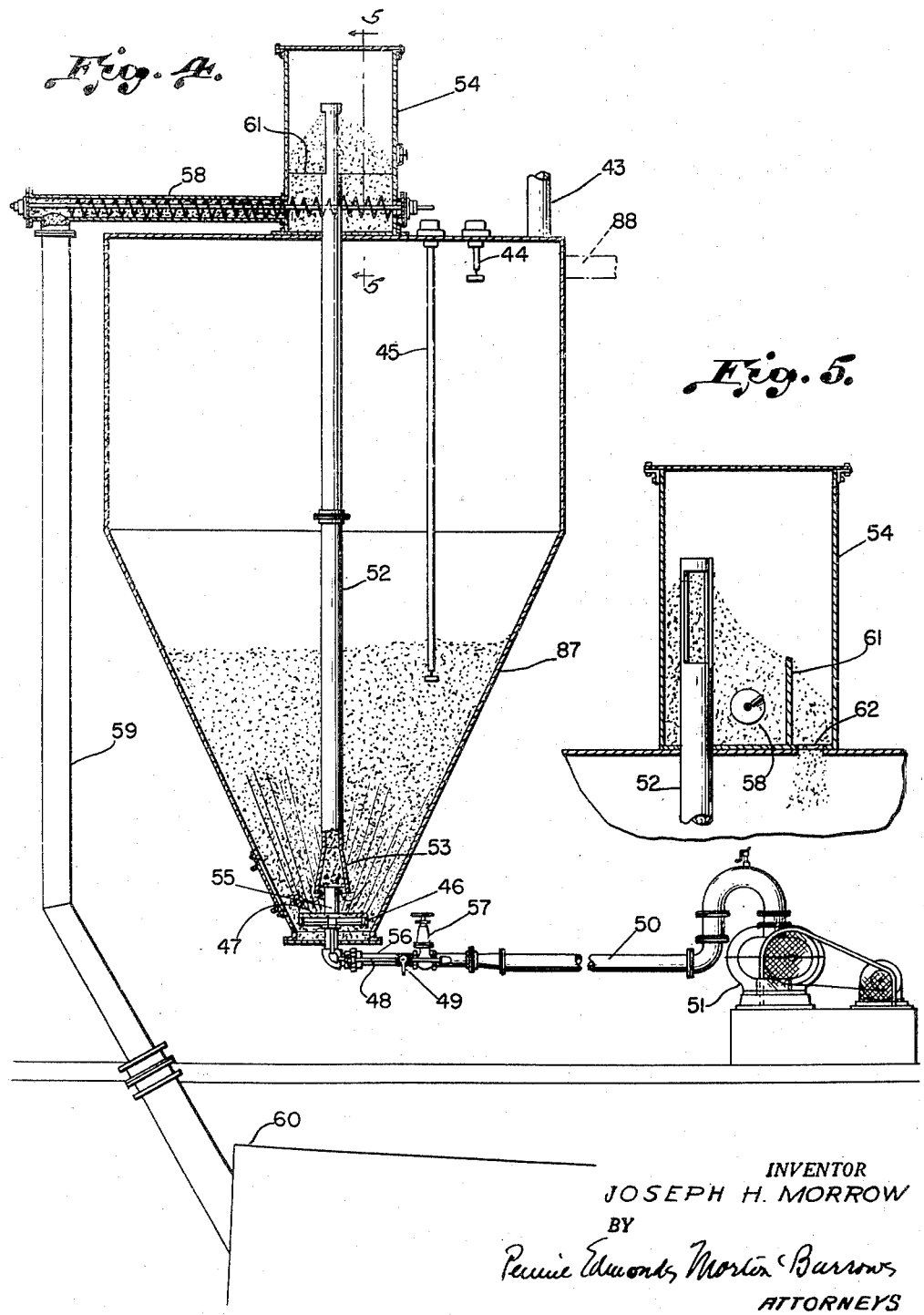

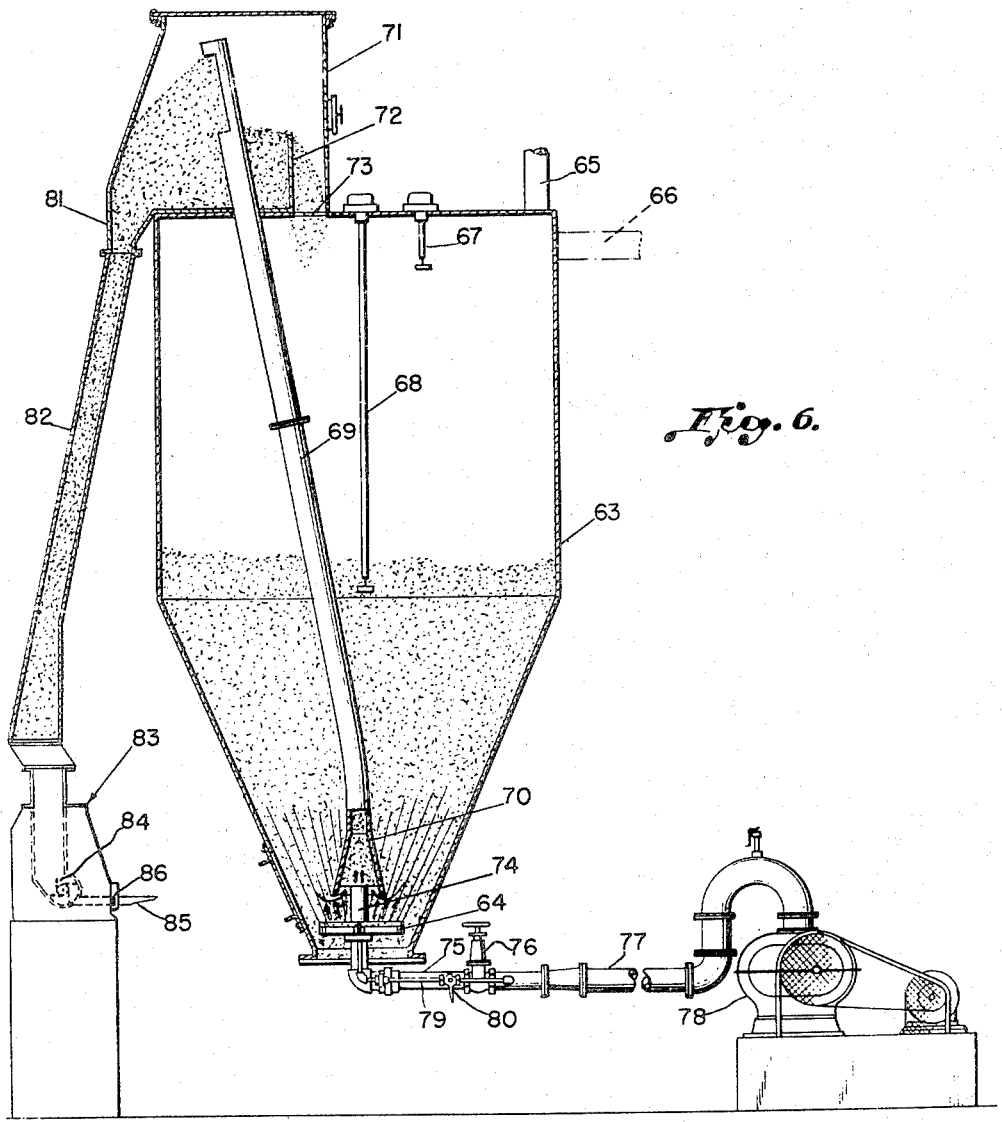

2,509,984

UNITED STATES PATENT OFFICE 2,509,984

METHOD AND APPARATUS FOR HANDLING PULVERULENT MATERIALS

Joseph H. Morrow, Hokendauqua, Pa., assignor to Fuller Company, Catasauqua, Pa., a corporation of Delaware Application October 17, 1946, Serial No. 703,860

17 Claims. (Cl. 302—52)

This invention relates to the handling of pulverulent materials and finely divided solids such, for example, as cement, cement raw materials, pulverized coal, lime and soda ash, powdered catalysts, fertilizers, and similar materials, which have the characteristic of becoming fluent when admixed with air or other inert gas in proper proportions. More particularly, the invention is concerned with a novel method for feeding such materials at a substantially volumetrically uniform rate and with apparatus by which the new method may be advantageously practiced.

The feeding at a constant rate of large tonnages of finely ground or powdered substantially dry materials is a major problem in many manufacturing operations. In cement plants, for example, the feeding of finished cement during bulk loading and the packaging of the cement in bags of uniform weight require extensive installations to produce constant results and, in many such plants, added problems are involved in properly feeding pulverized coal and dry raw materials. The difficulties encountered arise from the irregular delivery rates of most volumetric feeding means and such irregularities cause trouble not only in the specific instances mentioned but also in making a dry raw material mix by blending various components as well as in the operation of a rotary kiln in which the feed rates of the powdered coal and the raw materials should be closely correlated. Such undesirable variations in the feeding of pulverulent materials are caused mainly by changes in density of the materials resulting from gradual de-aeration or packing of the materials in the storage bin supplying the feeding mechanism and also by mechanical effects, such as bridging of the material in the feed vessel, followed by flooding.

Variations in the feeding of pulverulent materials are particularly troublesome and costly in the operation of packers intended to fill bags with the constant weight of material. Such packing machines commonly include volumetric feeding means as well as weight responsive means for cutting off the flow of the material through the nozzles, but, even though the weight responsive means may be carefully regulated, variations of several pounds in the bag weights frequently occur and are attributable in most cases to irregular delivery of the material to the volumetric feeding devices. As the producer is paid on the basis of a standard bag weight, it will be evident that excessive bag weights represent a financial loss.

The present invention is directed to the provision of a method of delivering pulverulent material at a substantially volumetrically uniform rate, which overcomes the difficulties encountered in the feeding of such material in accordance with present practice. In the new method, the difficulties are overcome by rendering the material fluent and then elevating the fluidized material to a container having a fixed orifice through which the material is supplied to the delivery device, such as a volumetric feeder. The container is so constructed as to hold a body of constant depth above the orifice, and the material is elevated to the container at a rate somewhat greater than the rate at which it leaves through the orifice, with the excess material overflowing and returning to the main source of supply. As there is always a constant head of the fluidized material over the orifice, the flow therethrough to the delivery device is uniform.

In the practice of the method, the first step is that of aerating the material to render it fluent and this can be accomplished by causing an inert gas, such as air, to be diffused through the material as, for example, through a gas-permeable wall having fine pores through which the gas can pass. When the gas is thus diffused through the material under proper conditions, the material will become fluent and remain in that condition for a substantial period of time. In order to elevate the material through the container, I make use of an elevating pipe, which is generally vertical and has an intake below the body of the material. When the material is rendered fluent, as above described, it tends to rise through the intake into the pipe. If additional gas is introduced into the material within the pipe near the intake in proper volume, the gas and material will rise through the pipe and be discharged from the upper end. The outlet from the pipe is so disposed that the material issuing therefrom enters the container and the container includes a wall which cooperates with the remaining walls of the container to provide a space holding a quantity of material of constant depth, excess material flowing over the upper edge of the wall for return to the main body being elevated. The material within the container flows through the orifice at a uniform rate and may be conducted to the volumetric feeding means of a packer, to a burner, or to any other device requiring a supply of material at a uniform rate.

In order that the invention may be clearly understood, reference may be made to the accompanying drawings in which:

Fig. 1 is a vertical sectional view of one form of apparatus for practicing the new method and suitable for feeding powdered coal;

Fig. 2 is a vertical sectional view of a modified form of the apparatus;

Fig. 3 is a view in elevation, with parts broken away, of the apparatus shown in Fig. 2 and at right angles to Fig. 2;

Fig. 4 is a vertical sectional view of a modified form of the apparatus employed in association with a rotary kiln;

Fig. 5 is a sectional view on the line 5—5 of Fig. 4; and

Fig. 6 is an elevational view partly in section illustrating the use of the apparatus in connection with a packing apparatus.

In the apparatus illustrated in Fig. 1, the pulverulent material is contained within a bin or tank 8 provided near its bottom with gas diffusing means, which include a false bottom 9 within the tank made of blocks of gas-permeable material. Air is supplied beneath the blocks through a connection 10 leading from a blower (not shown) and the gas escapes through the blocks 9 and into the material to render it fluent. The tank is provided with a vent 11 to the atmosphere, so that the interior of the tank is maintained at atmospheric pressure. In some installations, it may be desirable to connect the vent to a dust collecting system, but the use of such a system does not reduce the pressure within the tank below atmospheric to any significant degree. The tank is also provided with an inlet pipe 12 through which additional material can be introduced into the tank. If desired, the tank may be provided with high and low level signal devices designated 13 and 14, respectively, and these devices may merely give an indication, when the level of the material in the bin is too high or too low, or they may control the feeding means by which the material is supplied to the bin, as is customary.

Near its upper end, the tank is provided with an opening through which the interior of the tank is in communication with a container 15. In the form illustrated, the container has a sloping wall 16 leading downwardly and away from the lower edge 17 of the opening. The container has an outlet orifice 15a at its lower end through which material may pass to a volumetric feeding device 18, the device discharging the material into a conveyor pipe 19, through which the material can be conducted in suspension in air to any desired delivery point.

The elevation of the material from the tank 8 to the container 15 is effected by means of a pipe 20 which extends generally upwardly within the tank and preferably has a frusto-conical intake section 21 at its lower end. At its upper end, the pipe is curved as indicated at 22, the end of the pipe preferably extending through the opening in the wall of the tank into container 15. An air pipe 23 extends through the bottom of the tank and the false bottom to terminate a short distance within the intake 21 of the pipe 20. Air is supplied to pipe 23 through a line 24 leading from a blower and the volume of air discharged through pipe 23 is substantially greater than that used for rendering the material fluent.

In the practice of the new method by the apparatus described, the pulverulent material is fed into tank 8 and a body of the material is maintained therein with its level somewhere between the ends of the high and low signal devices 13, 14.

Air is admitted through the false bottom to be diffused through the material and the material is thereby rendered fluent and begins to rise through the intake 21 of pipe 20. Air in substantially greater volume is admitted through pipe 23 into intake 21 and the air and material then rises through pipe 20 with considerable velocity and the material is directed by the curved end 22 of pipe 20 into container 15. When the container is filled to the level of the edge 17 of the opening between the tank and the container, excess material flows back over that edge into the tank. The material within the container flows through the outlet orifice into the volumetric feeder and, since the wall 16 in cooperation with the other walls of the container defines a space of constant depth, there is a constant head of material above the outlet orifice. As a result, the material flows at a uniform rate through the orifice to the feeder and the feeder can, accordingly, deliver the material at a constant rate to the conveyor pipe 19.

The apparatus illustrated in Figs. 2 and 3 includes a container which is separate from the main supply tank. The tank 25 is provided with air diffusing means in its lower end in the form of a false bottom 26 of gas-permeable material, beneath which air is supplied through a line 27. The tank has a vent 28 to the atmosphere and is supplied with material through a line 29. An elevator pipe 30 extends upward from near the bottom of tank 25 and out through the upper wall of the tank. Pipe 30 has an intake section 31 at its lower end, into which air for elevating purposes is admitted through a pipe 32 supplied with air through a line 33. Pipe 30 extends into a container 34 mounted at the desired elevation and open to the atmosphere through a vent 35. Near its lower end, the container 34 is formed with an outlet orifice 34a, from which leads the casing 36 of a screw conveyor. The conveyor includes a shaft 37 carrying screw flights 38 and the shaft extends across the bottom of the container and may be driven in any suitable way, as by a pulley 39. At the end remote from the container, the casing is provided with an outlet from which leads a conduit 40. The wall of the container is provided with an opening 41 at a distance above its bottom and a return pipe 42 leads from the opening to the interior of tank 25.

In the practice of the method by the apparatus shown in Figs. 2 and 3, the material within tank 25 is rendered fluent and then elevated through pipe 30 to be discharged within container 34. The body of material within the container is at a constant depth, since any excess material may overflow the lower edge of opening 41 and return through pipe 42 to the tank 25. Because of the constant depth of the material above outlet 34a, the material within the container is fed therefrom at a constant rate by the screw conveyor, which acts as a volumetric feeding means.

The apparatus shown in Fig. 4 includes a tank 87 having a conical lower end and supplied with material through a line 88. The tank is open to the atmosphere through the vent 43 and is provided with high and low level signal devices 44 and 45, respectively. Air diffusing means are mounted in the tank near the lower end of the conical portion and take the form of a casing 46 having an upper wall 47 made of gas-permeable material. Air for diffusing purposes is supplied to the interior of the casing through a supply line 48 controlled by a valve 49 and connected to a line 50 leading from a blower 51.

An elevator pipe 52, having a frusto-conical intake section 53 at its lower end, extends upwardly from above the air diffusing means and passes through the upper wall of the tank and into a container 54 mounted on top of the tank. Air for elevating purposes is introduced into the intake section of pipe 52 through a nozzle 55 which extends through the casing 46 and the bottom of the tank and is supplied with air through a line 56 containing a valve 57 and connected to the air line 50. The container 54 has an outlet orifice, to which is connected the casing 58 of a screw conveyor. The conveyor casing has an outlet from which a line 59 leads into the upper end of a rotary kiln 60. In order that a constant head of material may be maintained within container 54, a wall 61 is mounted within the container at one side of an outlet opening 62, which is in communication through an opening in the top of the tank 87 with the interior thereof. As the material is elevated through pipe 52 and discharged into the container, the material collects at one side of wall 61, until the material begins to overflow the top of the wall and return through outlet 62 into the interior of the tank. In this manner, a constant head of material is maintained above the orifice through which the screw conveyor is supplied and the conveyor, which serves as volumetric feeding means, functions at a uniform rate.

In Fig. 6, there is illustrated an installation for the use of the new method in supplying pulverulent material to a bag packer. The apparatus includes a tank 63 having a conical lower end, within which is mounted an air diffusing means 64 similar to that employed in the Fig. 4 apparatus. The tank is open to the atmosphere through a vent 65 and is supplied with material through a line 66. The tank is provided with high and low level signal devices 67 and 68, respectively. An elevator pipe 69 having a frusto-conical intake section 70 leads upward from the lower end of the tank through the top thereof and into a container 71, which is shown as mounted on top of the tank. The pipe extends into the upper part of the container and has a discharge opening at one side of a vertical wall 72 within the container. At the other side of the wall 72, the bottom of the container and the top of the tank are formed with registering openings 73, so that material collects in the container to a level determined by the height of wall 72 and excess material then overflows the wall and returns to the tank. Air for elevating the material is introduced into the intake 70 of pipe 69, through a nozzle 74 supplied through a line 75 containing a valve 76 and connected to a line 77 leading from a blower 78. A branch line 79 leads from line 77 ahead of valve 76 and supplies air to the diffusing means 64 in amounts controlled by valve 80 in the branch.

The container 71 is provided with an outlet spout 81 connected by a line 82 to a packer, generally designated 83. The packer includes a volumetric feeder 84 supplying a horizontal nozzle 85, upon which a bag to be filled may be mounted. The packer is also provided with a cut-off 86 operating in response to the weight on the nozzle and cutting off the supply through the nozzle, while the bags are being changed.

In all forms of apparatus for practicing the new method, the material to be fed at a uniform rate is first aerated to render it fluent and then raised through a space long in relation to its diameter by introduction of inert gas into the lower end of the space, the gas being supplied for elevating purposes in a volume substantially greater than that used for fluidizing the material. The fluent material elevated through the space, as described, is collected in a body of constant depth and escapes from the body through a fixed orifice. As the head of material above the orifice is the same at all times, the flow through the orifice is uniform. Excess material supplied to the body above the orifice is returned to the original supply or may be disposed of otherwise. The container is connected through the orifice with volumetric feeding means and, since the supply to such means is uniform, the volumetric feeder functions properly at all times and is not made irregular in action, because of bridging and flooding. Also the density of the aerated material in the container remains constant and there is no irregularity in feeding action resulting from changes in density.

In the various forms of apparatus illustrated, the means for aerating the pulverulent material have been illustrated as a false bottom of blocks of gas-permeable material within a tank, but it is to be understood that other forms of aerating means may be employed, such as air rings or perforated plates. Also, it is not necessary that the aerating means have an area as great as the cross-sectional area of the tank.

The apparatus disclosed for elevating the pulverulent material from the supply tank forms the subject matter of my application, Serial No. 703,859 filed October 17, 1946. The apparatus herein disclosed and including a packer is the subject matter of my application, Serial No. 703,861 filed October 17, 1946.

I claim:

1. Apparatus for delivering pulverulent material at a uniform rate, which comprises a vessel for holding a body of the material, means for maintaining the interior of the vessel at atmospheric pressure, means for introducing inert gas into the body of material in the vessel to render the material fluent, a container for receiving material elevated from the body in the vessel, means for elevating material from the body in the vessel and delivering it into the container, said means including a pipe extending upward from near the bottom of the vessel and means for introducing inert gas under pressure into the pipe at its lower end to cause the material and gas to rise through the pipe, the container having a wall for confining a body of material of predetermined depth within the container and also having an opening through which material overflowing the wall may escape from the container, and an outlet from the container for discharge of material from the body of material confined therein.

2. Apparatus for delivering pulverulent material at a uniform rate, which comprises a vessel for holding a body of the material, means for maintaining the interior of the vessel at atmospheric pressure, means for introducing inert gas into the body of material in the vessel to render the material fluent, a container for receiving material elevated from the body in the vessel, means for elevating material from the body in the vessel and delivering it into the container, said means including a pipe extending upward from near the bottom of the vessel and means for introducing inert gas under pressure into the pipe at its lower end to cause the material and gas to rise through the pipe, the container having a wall confining a body of material of predetermined depth within the container and also having an opening through which material overflowing the wall may escape from the container, an outlet from the container for discharge of material from the body of material confined therein, and a volumetric feeder receiving material through said outlet.

3. Apparatus for delivering pulverulent material at a uniform rate, which comprises a vessel for holding a body of the material, means for maintaining the interior of the vessel at atmospheric pressure, means for introducing inert gas into the body of material in the vessel to render the material fluent, a container for receiving material elevated from the body in the vessel, means for elevating material from the body in the vessel and delivering it into the container, said means including a pipe extending upward from near the bottom of the vessel and having an intake at its lower end and an outlet at its upper end discharging into the container, and means for introducing inert gas under pressure into the intake of the pipe to cause the material and gas to rise through the pipe, the container having a wall for confining a body of material of predetermined depth within the container and also having an opening through which material overflowing the wall can return to the vessel, and an outlet from the container for discharge of material from the body of material confined therein.

4. Apparatus for delivering pulverulent material at a uniform rate, which comprises a vessel for holding a body of the material, the vessel having a gas-permeable wall in contact with the material, means for supplying an inert gas to flow through the wall into the material to render it fluent, means for maintaining the interior of the vessel at substantially atmospheric pressure, a container for receiving material elevated from the body in the vessel, means for elevating material from the body in the vessel and delivering it into the container, said means including a pipe extending upward from near the bottom of the vessel and means for introducing inert gas under pressure into the pipe at its lower end to cause the material and gas to rise through the pipe, the container having a wall for confining a body of material of predetermined depth within the container and also having an opening through which material overflowing the wall may escape from the container, and an outlet from the container for discharge of material from the body of material confined therein.

5. Apparatus for delivering pulverulent material at a uniform rate, which comprises a vessel for holding a body of the material, means for maintaining the interior of the vessel at atmospheric pressure, means for introducing inert gas into the body of material in the vessel to render the material fluent, a container for receiving the material elevated from the vessel, a generally vertical pipe having an intake near the bottom of the vessel, the pipe having an outlet at its upper end positioned for delivery of material to the container, means for introducing inert gas under pressure into the pipe through the intake to cause material and gas to flow upwardly through the pipe and discharge through the outlet into the container, means for confining a body of material of predetermined depth within the container, an opening from the container for discharge of material from the body of material therein, and a second opening from the container through which material in excess of that required to maintain the body of material of predetermined depth in the container may escape from the container for return to the vessel.

6. Apparatus for delivering pulverulent material at a uniform rate, which comprises a vessel for holding a body of the material, means for maintaining the interior of the vessel at atmospheric pressure, means for introducing inert gas into the body of material in the vessel to render the material fluent, a container for receiving the material elevated from the vessel, a generally vertical pipe having an intake near the bottom of the vessel, the pipe having an outlet at its upper end positioned for delivery of material to the container, means for introducing inert gas under pressure into the pipe through the intake to cause material and gas to flow upwardly through the pipe and discharge through the outlet into the container, means for confining a body of material of predetermined depth within the container, an opening from the container for discharge of material from the body of material therein, a second opening from the container through which material in excess of that required to maintain the body of material of predetermined depth in the container may escape from the container, and a conduit leading from the second opening into the interior of the vessel for return of material passing through the second opening from the container to the vessel.

7. Apparatus for delivering pulverulent material at a uniform rate, which comprises a vessel for holding a body of the material, means for maintaining the interior of the vessel at atmospheric pressure, means for introducing inert gas into the body of material in the vessel to render the material fluent, a container for receiving material elevated from the vessel, a generally vertical pipe having an intake near the bottom of the vessel, the pipe having an outlet at its upper end positioned for the delivery of material to the container, means for introducing inert gas under pressure into the pipe through the intake to cause the material and gas to flow upwardly through the pipe and discharge through the outlet into the container, means for confining a body of material of predetermined depth within the container, an opening from the container for discharge of material from the body of material therein, a volumetric feeder connected to the opening, and a second opening from the container through which material in excess of that required to maintain the body of material of predetermined depth in the container may escape from the container for return to the vessel.

8. Apparatus for delivering pulverulent material at a uniform rate, which comprises a vessel for holding a body of the material, means for maintaining the interior of the vessel at atmospheric pressure, means for introducing inert gas into the body of material in the vessel to render the material fluent, a container mounted on an upper part of the vessel for receiving material elevated from the body in the vessel, means for elevating material from the body in the vessel and delivering it into the container, said means including a pipe extending upward from near the bottom of the vessel and means for introducing inert gas under pressure into the pipe at its lower end to cause the material and gas to rise through the pipe, the container having a wall for confining a body of material of predetermined depth within the container and also having an opening through which material overflowing the wall may escape from container, and an outlet from the container for discharge of material from the body of material confined therein.

9. Apparatus for delivering pulverulent material at a uniform rate, which comprises a vessel for holding a body of the material, means for maintaining the interior of the vessel at atmospheric pressure, means for introducing inert gas into the body of material in the vessel to render the material fluent, a container for receiving material elevated from the body in the vessel, means for elevating material from the body in the vessel and delivering it into the container, said means including a pipe extending upward from near the bottom of the vessel and means for introducing inert gas under pressure into the pipe at its lower end to cause the material and gas to rise through the pipe, the container having a wall for confining a body of material of predetermined depth within the container and also having an opening through which material overflowing the wall may escape from the container, an outlet from the container for discharge of material from the body of material confined therein, and a screw conveyor for removing material issuing through the outlet from the container at a substantially volumetrically uniform rate.

10. Apparatus for delivering pulverulent material at a uniform rate, which comprises a vessel for holding a body of the material, means for maintaining the interior of the vessel at atmospheric pressure, means for introducing inert gas into the body of material in the vessel to render the material fluent, a container for receiving material elevated from the body in the vessel, means for elevating material from the body in the vessel and delivering it into the container, said means including a pipe extending upward from near the bottom of the vessel and means for introducing inert gas under pressure into the pipe at its lower end to cause the material and gas to rise through the pipe, the container having a wall for confining a body of material of predetermined depth within the container and also having an opening through which material overflowing the wall may escape from the container, an outlet from the container for discharge of material from the body of material confined therein, and a rotary feeder for removing material issuing through the outlet from the container at a substantially volumetrically uniform rate.

11. Apparatus for delivering pulverulent material at a uniform rate, which comprises a vessel for holding a body of the material, means for maintaining the interior of the vessel at atmospheric pressure, means for introducing inert gas into the body of material in the vessel to render the material fluent, a container for receiving material elevated from the body in the vessel, means for elevating material from the body in the vessel and delivering it into the container, said means including a pipe extending upward from near the bottom of the vessel and means for introducing inert gas under pressure in relatively large volume into the pipe at its lower end to cause the material and gas to rise through pipe, the container having a wall for confining a body of material of predetermined depth within the container and also having an opening through which material overflowing the wall may escape from the container, and an outlet from the container for discharge of material from the body of material confined therein.

12. A method of delivering material at a substantially volumetrically uniform rate which comprises maintaining a body of material about the lower end of a generally vertical space long in comparison to its cross-sectional area, introducing inert gas of relatively low pressure in relatively small volume into the material to render it fluent, introducing inert gas of relatively low pressure and in relatively larger volume into the interior of the space at its lower end to cause the material and gas to rise through the space and issue at the upper end thereof, collecting material issuing from said space and confining it in a body of predetermined depth while returning to the body about the lower end of said space material in excess of that required to maintain said body of predetermined depth, and withdrawing material from said body of predetermined depth at a substantially uniform rate through a fixed orifice.

13. A method of delivering material at a substantially volumetrically uniform rate through a fixed orifice which comprises maintaining a body of the material about the lower end of generally vertical space which is long in comparison to its diameter, aerating the material to render it fluent by introducing inert gas therein, elevating the aerated material through the space by introducing inert gas under pressure into the lower end of the space, confining the aerated material issuing from the upper end of said space in the form of a body of fixed depth above said orific while directing excess material back to the body about the lower end of the space, and withdrawing material through said orifice at a substantially uniform rate.

14. A method of delivering material at a substantially volumetrically uniform rate, which comprises maintaining a body of material about the lower intake end of a generally vertical pipe long in comparison to its cross-sectional erea, introducing an inert gas at relatively low pressure into the material beneath the lower end of the intake in such volume and manner as to fluidize the material and to render it sufficiently fluent to enter the intake in the pipe and rise therein, introducing an inert gas at substantially greater volume into the intake of the pipe above the plane of the lower end thereof and in an upward direction toward the pipe to cause the gas and material to rise in the pipe and issue at the upper end thereof, collecting material issuing from said pipe and confining it in a body of predetermined depth while returning to the body of material about the intake end of the pipe material in excess of that required to maintain said body of predetermined depth, and drawing material from said body of predetermined depth at a substantially uniform rate through a fixed orifice.

15. Apparatus for delivering pulverulent material at a uniform rate, which comprises a vessel for holding a body of the material, means for maintaining the interior of the vessel at substantially atmospheric pressure, a container for receiving material elevated from a body thereof in the vessel, a discharge pipe leading upwardly from the interior of the vessel and having an intake at its lower end, gas diffusing means lying beneath the intake thereof and of larger area than the open end thereof through which an inert gas may be diffused into the pulverulent material in the vessel in sufficient volume to fluidize it and render it sufficiently fluent to enter the intake and rise therein, means for introducing an inert gas under pressure in substantially greater volume into the material within the intake to cause the material to travel upwardly with the gas through the pipe, and to be discharged therefrom into said container, the container having a wall for confining a body of material of predetermined depth within the container and also having an opening through which material overflowing the wall may escape from the container for return to the vessel, and an outlet from the container for discharge of material from the body of material confined therein.

16. Apparatus for delivering pulverulent material at a uniform rate, which comprises a vessel for holding a body of the material, means for maintaining the interior of the vessel at substantially atmospheric pressure, a container for receiving material elevated from a body thereof in the vessel, a discharge pipe leading upwardly from the interior of the vessel and having an intake at its lower end, gas diffusing means lying beneath the intake thereof and of larger area than the open end thereof through which an inert gas may be diffused into the pulverulent material in the vessel in sufficient volume to fluidize it and render it sufficiently fluent to enter the intake and rise therein, means for introducing an inert gas under pressure in substantially greater volume into the material within the intake to cause the material to travel upwardly with the gas through the pipe, and to be discharged therefrom into said container, the container having a wall for confining a body of material of predetermined depth within the container and also having an opening through which material overflowing the wall may escape from the container for return to the vessel, an outlet from the container for discharge of material from the body of material confined therein, and a volumetric feeder receiving material discharged through said outlet.

17. Apparatus for delivering pulverulent material at a uniform rate as defined in claim 15, in which the wall of the container for confining a body of material of predetermined depth within the container is positioned at a level above the bottom of the vessel, and in which material overflowing said wall flows by gravity back to the body of material within the vessel.

JOSEPH H. MORROW.

REFERENCES CITED

The following references are of record in the file of this patent:

UNITED STATES PATENTS

| Number | Name | Date |
| --- | --- | --- |
| 727,030 | Tilghman | May 5, 1903 |
| 1,339,977 | Pruden | May 11, 1920 |
| 1,347,358 | Adams | July 20, 1920 |
| 1,566,536 | Hoving | Dec. 22, 1925 |
| 2,125,913 | Goebels | Aug. 9, 1938 |
| 2,316,814 | Schemm | Apr. 20, 1943 |